March 25, 1969    J. F. RIVERS ET AL    3,434,408
VEHICLE WINDOW AIR VENT
Filed July 14, 1966
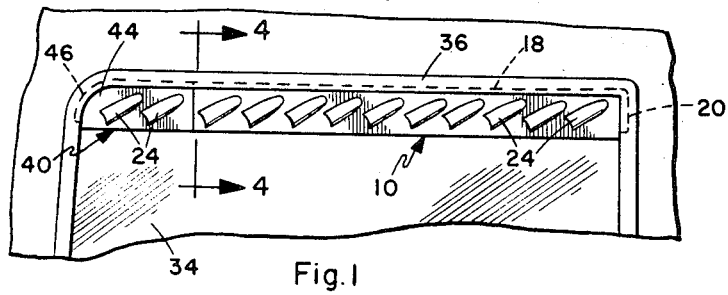
Fig. 1
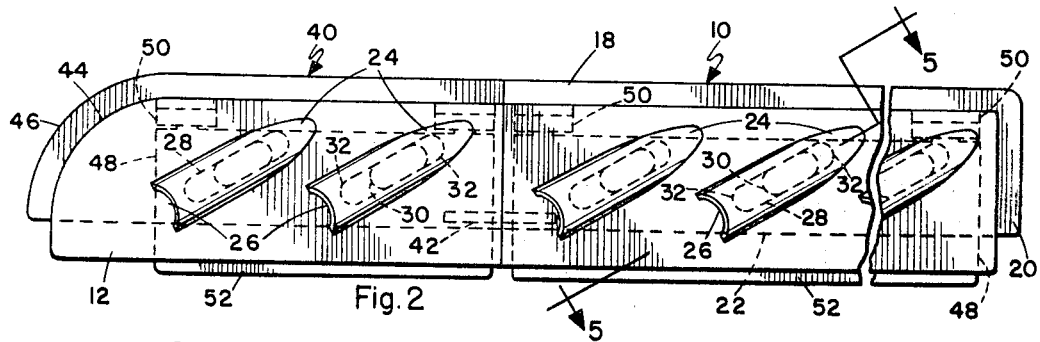
Fig. 2
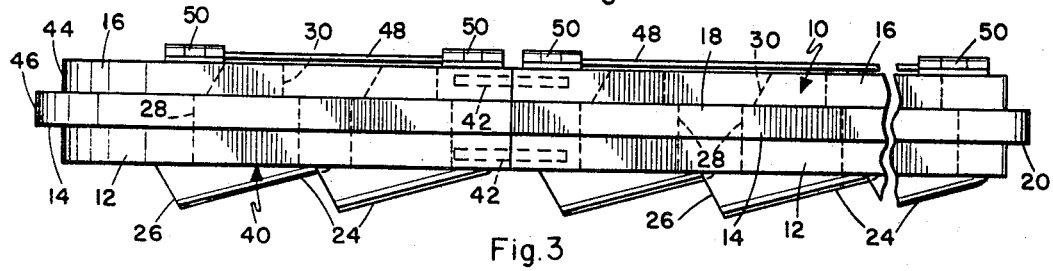
Fig. 3
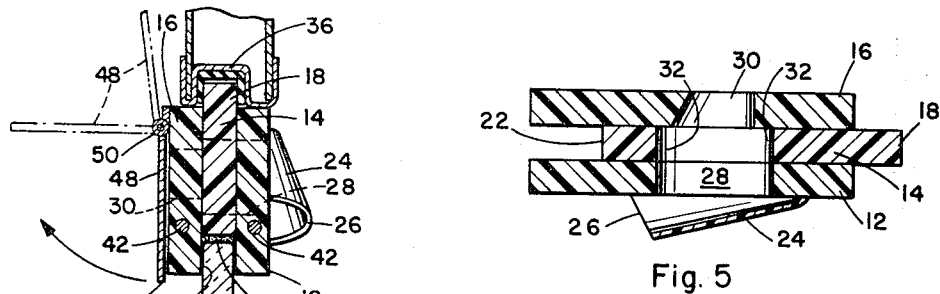
Fig. 4
Fig. 5
*INVENTORS*
JOE F. RIVERS
FRANK J. RIVERS
BY
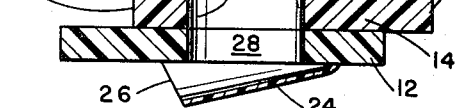

3,434,408
VEHICLE WINDOW AIR VENT
Joe F. Rivers and Frank J. Rivers, both of 5355 Clairemont Mesa Blvd., San Diego, Calif. 92117
Filed July 14, 1966, Ser. No. 565,271
Int. Cl. B60h 1/24
U.S. Cl. 98—2　　　　　　　　　　　　　　　2 Claims

ABSTRACT OF THE DISCLOSURE

A vehicle window ventilator to fit above a sliding window, with exterior air scoops leading to transverse openings through the ventilator, the transverse openings being sharply reduced at the outlet ends thereof and being closable by a hinged baffle panel, and the ventilator has a replaceable adapter portion of construction similar to the main body portion of the ventilator.

---

The present invention relates to ventilators and specifically to a vehicle window air vent.

Some types of vehicle window vents utilize a scoop or collector, sometimes containing cooling means, which fits into a window frame and is held in place by the window. This type of device projects from the vehicle, is clumsy and interferes with normal operation of the window. Another type of vent is an insertable panel of perforated screen which fits into a portion of the window opening, but does not provide significant air flow. These must be removed if the vehicle is to be locked securely, since the screen material is easily broken to gain access to the vehicle.

The vent described herein overcomes these difficulties and combines the desirable features of controllable forced air flow, compactness, since it fits closely into the window opening, non-interference with window operation, and security, the vent being tamper-proof and designed to prevent insertion of door opening devices.

The vent and its construction are illustrated in the drawing, in which:

FIGURE 1 is a side elevation view of the vent unit installed in a vehicle window;

FIGURE 2 is an enlarged side elevation view of the vent unit;

FIGURE 3 is a top plan view thereof;

FIGURE 4 is an enlarged sectional view taken on line 4—4 of FIGURE 1; and

FIGURE 5 is a sectional view taken on line 5—5 of FIGURE 2.

Similar characters of reference indicate similar or identical elements and portions throughout the specification and throughout the views of the drawing.

The vent unit is an elongated, generally rectangular body 10 illustrated as being made from an outer portion or panel 12, a center panel 14 and an inner panel 16, laminated by any suitable bonding means. Center panel 14 is offset upwardly to provide a longitudinal flange 18 along the top of the body and also projects from the rear end to form an end flange 20. In addition, the offset of the center panel leaves a longitudinal channel 22 in the lower portion of body 10. Spaced along the outer face of outer panel 12 are a plurality of hemi-bullet shaped scoops 24 each having an open forward end 26 and tapering upwardly and rearwardly at an angle to merge with the panel. Under each scoop 24 is an elongated inlet opening 28 extending through the outer panel 12 and the center panel 14, the inner panel 16 having a smaller outlet opening 30 registered with each inlet opening. The smaller size of the outlet opening 30 leaves a blind socket portion 32 at each end of the inlet opening 28, as in FIGURE 5, the purpose of which is hereinafter described.

The unit fits into a vehicle window with the top edge portion of the window glass 34 seated in the channel 22 and the flanges 18 and 20 in the window frame channel 36, the window ordinarily being raised to hold the unit securely in place.

To make the unit adaptable to a variety of vehicles, the body 10 may be provided with a detachable adapter portion 40, similar in all structural aspects to the main body. The adapter portion 40 and body 10 are joined by dowel pins 42 which align the two elements, the assembly being held in place by the window structure. By utilizing adapter portions of various lengths, one basic body size can be used for most vehicle windows. The forward end of adapter portion 40 may be curved, as at 44, to fit particular window corner shapes, the flange end portion 46 being correspondingly curved.

To provide for control or shutting off of the air flow the body 10 has a baffle plate 48 mounted on inner panel 16 to cover the entire inner panel, or at least the outlet openings 30. Baffle plate 48 is attached at its upper edge to the upper edge of the inner panel by means of hinges 50, which are of the stiff or frictionally restrained type so that the baffle plate will remain in any set position, as indicated in broken lines in FIGURE 4. The lower edge 52 of baffle plate 48 may extend below the body 10 to provide a convenient grip for raising the plate, or any suitable handle may be attached. With the baffle plate lowered, all air flow is shut off. Partial raising of the baffle plate will deflect the air flow somewhat downwardly if desired, a range of control being available by adjusting the plate. Adapter portion 40 is fitted with a similar baffle plate operable in a like manner. Since it is usually desirable to be able to operate the window in a normal manner, the vent can be positively connected to ride up and down with the window by inserting an adhesive element, such as double faced adhesive tape 54, in channel 22 to grip the window edge.

With the vehicle in motion a considerable flow of air will pass through the vent, which is high enough above the road to avoid most of the exhaust gases from other vehicles. The downwardly opening scoops and the offset path through the body will prevent rain from entering. When the vehicle is stationary, adequate circulation is available for most conditions, particularly if more than one window is fitted with the vent. This is especially advantageous when pets are left in a parked vehicle, or occupants desire to keep the vehicle securely closed. It is interesting to note that a very efficient cross ventilation flow may be obtained by reversing one vent unit so that the scoops open to the rear. The suction created at the scoop openings will extract air from the vehicle and add to the effect of a normally positioned vent in another window.

The vent can be left in place with the vehicle locked, since the particular scoop and opening arrangement will prevent the use of wires, cables or "jimmy" type apparatus to open a door. If a wire or similar element is sufficiently rigid to engage and actuate a door handle or lock, it will not bend sufficiently to pass through the openings but will become trapped in the blind sockets 32. If a more flexible element is used and can be threaded through the openings, it will be very difficult to maneuver the inner end with any accuracy to engage a door lock, making it impractical to attempt illegal entry. The substantial structure of the vent will withstand considerable abuse, the security provided being unimpaired with respect to that of the conventional vehicle without vents.

It is understood that minor variation from the form of the invention disclosed herein may be made without departure from the spirit and scope of the invention, and that the specification and drawing are to be considered as merely illustrative rather than limiting.

We claim:
1. A vehicle window air vent, for use with a sliding window glass, comprising:
   an elongated body having an inner and an outer portion and a longitudinal channel in the undeside thereof to receive the edge of a sliding window glass, and a longitudinal flange on the upper portion thereof to seat in a window frame;
   the outer portion having a plurality of longitudinally spaced inlet openings;
   a forwardly and downwardly opening scoop on the outside of said body over each of said inlet openings;
   the inner portion having a plurality of outlet openings therein in registration with said inlet openings and being substantially smaller than the inlet openings;
   said inlet openings being elongated and inclined to the length of said body, the ends of said inlet openings extending beyond said outlet openings and forming blind sockets in the body;
   said portions of the body comprising an outer panel, an inner panel and a center panel laminated together, with said center panel vertically offset to provide said channel and said flange;
   said inlet openings extending through said outer panel and said center panel, said outlet openings being in said inner panel only;
   and a baffle panel on the inner panel to cover said outlet openings, said baffle panel having hinge means connected to said inner panel and said hinge means being frictionally restrained to hold the baffle panel in any position.

2. A vehicle window air vent according to claim 1, wherein said body has a replaceable adapter portion detachably secured thereto, said adapter portion having inlet and outlet openings similar to said body.

References Cited

UNITED STATES PATENTS

| | | | |
|---|---|---|---|
| 1,525,429 | 2/1925 | Hunter | 98—2 |
| 1,628,053 | 5/1927 | McTighe | 98—2 |
| 1,660,893 | 2/1928 | Smith | 98—2 |
| 1,728,777 | 9/1929 | Trier | 98—2 |
| 1,825,437 | 9/1931 | Yeagle | 98—2 |
| 2,640,408 | 6/1953 | Miles | 98—2 |
| 2,641,501 | 6/1953 | Ensey | 98—2 |
| 2,680,646 | 6/1954 | Bush | 98—2 |

MEYER PERLIN, *Primary Examiner.*